(12) United States Patent
Jung et al.

(10) Patent No.: US 8,619,383 B1
(45) Date of Patent: Dec. 31, 2013

(54) DISK DRIVE WITH DYNAMIC HEAD FLY HEIGHT BACK-OFF

(75) Inventors: Kameron K. Jung, Yorba Linda, CA (US); Jame Show Leiong Hii, Puchong (MY)

(73) Assignee: Western Digital Technologies, Inc., Irvine, CA (US)

( * ) Notice: Subject to any disclaimer, the term of this patent is extended or adjusted under 35 U.S.C. 154(b) by 461 days.

(21) Appl. No.: 12/978,477

(22) Filed: Dec. 24, 2010

(51) Int. Cl.
*G11B 21/02* (2006.01)
*G11B 5/09* (2006.01)

(52) U.S. Cl.
USPC .............................................. 360/75; 360/53

(58) Field of Classification Search
None
See application file for complete search history.

(56) References Cited

U.S. PATENT DOCUMENTS

| | | | |
|---|---|---|---|
| 6,894,854 B1 * | 5/2005 | Carlson et al. | 360/31 |
| 7,436,620 B1 | 10/2008 | Kang et al. | |
| 7,468,856 B2 | 12/2008 | Fitzpatrick et al. | |
| 7,616,398 B2 | 11/2009 | Gong et al. | |
| 8,300,338 B1 * | 10/2012 | McFadyen | 360/31 |
| 2008/0123214 A1 | 5/2008 | Zhu et al. | |
| 2009/0310246 A1 * | 12/2009 | Takahashi | 360/75 |
| 2010/0073805 A1 | 3/2010 | Amano | |

* cited by examiner

*Primary Examiner* — Andrew L Sniezek (57) ABSTRACT

A disk drive is disclosed comprising a first disk surface comprising multiple zones, each comprising multiple tracks, a first head actuated radially over the first disk surface to write data to and read data from the first disk surface, and control circuitry coupled to the head. The control circuitry sets the first head to a first fly height over a first zone, writes a data pattern on a first track in the first zone, reads the data pattern to determine a first value of a first metric, writes a first frequency pattern on the first track, determines an initial amplitude of the first frequency pattern, writes a second frequency pattern over the first frequency pattern, determines a first value of a second metric for the first frequency pattern, and determines a first fly height value for the first zone by utilizing the first values of the first and second metrics.

24 Claims, 6 Drawing Sheets

DISK DRIVE WITH DYNAMIC HEAD FLY HEIGHT BACK-OFF

BACKGROUND

Disk drives can comprise a disk surface and a head connected to a distal end of an actuator arm which is rotated about a pivot by a voice coil motor (VCM) to position the head radially over the disk surface. The disk surface typically comprises a number of concentric data tracks each partitioned into a number of data blocks. Access operations are performed by seeking the head to a target data track, and performing a write/read operation on the data blocks within the data track. The disk surface typically comprises embedded servo sectors having position information recorded therein, such as coarse position information (e.g., a track address) and fine position information (e.g., servo bursts). A servo controller processes the servo sectors to position the head over the target data track.

An air bearing forms between the head and the disk surface due to high speed rotation of the disk surface. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. However, if the fly height of the head is too low, undesirable wear and damage to the head can occur as a result of contact between the head and the disk surface. On the other hand, a head fly height that is too high can result in undesirable degradation in write/read performance of the disk drive.

DETAILED DESCRIPTION OF EMBODIMENTS OF THE INVENTION

Figure 1A:
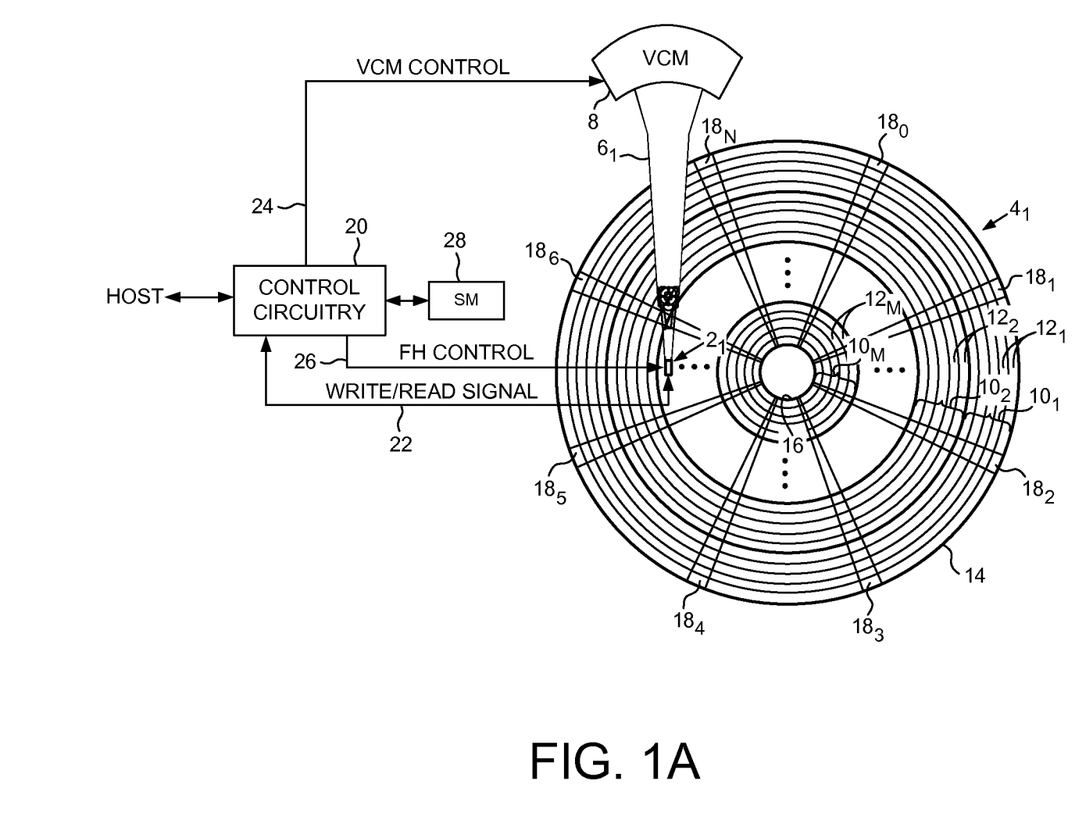
FIG. 1A shows a disk drive according to an embodiment of the present invention comprising a disk surface having tracks in multiple zones, a head actuated over the disk surface, a semiconductor memory (SM), and control circuitry, wherein the fly height of the head is controlled via a fly height control signal, and wherein a fly height value is determined by two metrics.

FIG. 1A shows a disk drive according to an embodiment of the present invention comprising a head $2_1$ actuated radially over a disk surface $4_1$ by an actuator arm $6_1$, and a voice coil motor (VCM) $8$ operable to rotate the actuator arm $6_1$ about a pivot. The disk surface $4_1$ comprises a plurality of zones $10_1$-$10_M$, wherein each zone $10_1$-$10_M$ comprises a respective plurality of tracks $12_1$-$12_M$. Thus, for example, zone $10_1$ comprises a plurality of tracks $12_1$, zone $10_2$ comprises a plurality of tracks $12_2$, and so forth. Each of the pluralities of tracks $12_1$-$12_M$ in each respective zone $10_1$-$10_M$ can be used by the host for reading and writing data. The plurality of zones $10_1$-$10_M$ extend between an outer diameter (OD) $14$ and an inner diameter (ID) $16$ of the disk surface $4_1$.

Figure 1B:
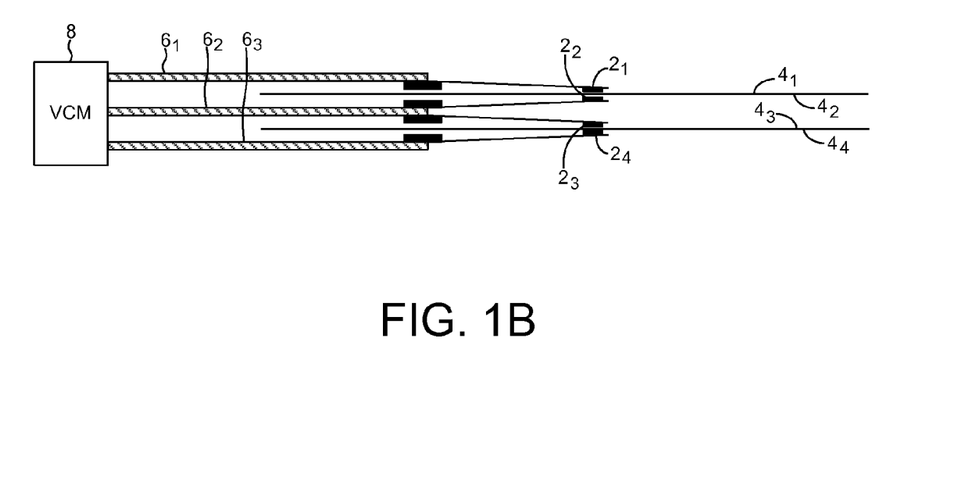
FIG. 1B shows an embodiment of the present invention comprising heads actuated over respective disk surfaces by a voice coil motor and actuator arms.

In an embodiment shown in FIG. 1B, a plurality of heads $2_1$-$2_4$ are actuated over respective disk surfaces $4_1$-$4_4$ by the VCM $8$ which rotates actuator arms $6_1$-$6_3$ about a pivot. A plurality of embedded servo sectors $18_0$-$18_N$ are recorded on each disk surface (e.g., disk surface $4_1$) to define the pluralities of data tracks $12_1$-$12_M$, wherein each servo sector comprises suitable position information, such as a track address providing coarse position information and servo bursts providing fine position information. As the head passes over a servo sector, control circuitry $20$ demodulates a read signal $22$ emanating from the head into a position error signal (PES). The PES is filtered by a suitable compensation filter to generate a control signal $24$ applied to the VCM $8$. The VCM $8$ rotates the actuator arm about the pivot in order to position the head radially over the disk surface in a direction that reduces the PES.

In the embodiment shown in FIG. 1A, the control circuitry $20$ is further operable to control a fly height (FH) of the head $2_1$ over the disk surface $4_1$ by using a fly height control signal $26$ to control a suitable fly height actuator. In one embodiment, the fly height actuator comprises a heater which controls fly height through thermal expansion. In another embodiment, the control circuitry $20$ controls the fly height of the head $2_1$ over the disk surface $4_1$ via a fly height actuator comprising a piezoelectric (PZT) actuator integrated with the head $2_1$. In one embodiment, the control circuitry $20$ is further operable to determine an initial fly height of the head $2_1$ over each of the plurality of zones $10_1$-$10_M$ of the disk surface $4_1$ by decreasing an unadjusted fly height of the head $2_1$ (by adjusting the fly height control signal $26$) until the head $2_1$ contacts the disk surface $4_1$ (touchdown). After the touchdown, the control circuitry is further operable to increase the unadjusted fly height of the head $2_1$ until the initial fly height is reached. The initial fly height provides an operational fly height for the head $2_1$. In an embodiment shown in FIG. 1B, the control circuitry $20$ determines an initial fly height for each head $2_1$-$2_4$ for each zone $10_1$-$10_M$ of a respective disk surface $4_1$-$4_4$.

In one embodiment, the control circuitry $20$ uses the FH control signal $26$ to increase power applied to a heater so as to cause the head $2_1$ to expand until a touchdown (i.e., contact between the head $2_1$ and the disk surface $4_1$) occurs. After the touchdown, the control circuitry uses the FH control signal $26$ to decrease the amount of power applied to the heater so as to cause the head $2_1$ to contract until the initial fly height (i.e., the desired spacing between the head $2_1$ and the disk surface $4_1$) is reached. In one embodiment, a FH control signal $26$ value corresponding to each initial fly height for each respective zone of each disk surface (e.g., each of disk surfaces $4_1$-$4_4$) is stored in a fly height table in the disk drive. In an embodiment of the invention, the control circuitry $20$ accesses the fly height table to set a corresponding initial fly height for each of the zones $10_1$-$10_M$ of each of the disk surfaces.

During the touchdown operation, the touchdown of the head may be detected in any suitable manner. In one embodiment, a microactuator may be integrated with the head (e.g., in a gimbal that couples a read/write element to a slider), or integrated with a suspension that couples a gimbal to the actuator arm $6_1$, or mounted on the actuator arm $6_1$, etc. The microactuator may be dedicated for detecting head touchdown, or it may also be used to actuate the head over the disk in fine movements during normal operation. Other embodiments may detect head touchdown by evaluating a temperature signal generated by a temperature sensor integrated with the head, wherein when head touchdown occurs, the temperature signal will exceed a threshold. Other techniques for detecting head touchdown include evaluating the amplitude of the read signal (e.g., when reading the servo bursts), evaluating the PES for serving the head, and/or evaluating a servo wedge-to-wedge timing all of which may be affected by head touchdown.

In an embodiment of the invention, after the initial fly heights have been determined for each head and corresponding disk surface, the performance of each head/disk surface combination is measured to determine tracks per inch (TPI) and bits per inch (BPI) or kilo flux changes per inch (KFCI) for each disk surface. In one embodiment of the invention, after the initial fly height and TPI and BPI have been determined for each disk surface (e.g., disk surface $4_1$), two metrics are used to determine if there is a sufficient performance budget to increase the initial fly height in one or more zones $10_1$-$10_M$ on each disk surface. In one embodiment, a first metric comprises an error rate and a second metric comprises an overwrite ratio. The error rate can be, for example, a bit error rate or a symbol error rate.

In the embodiment of FIG. 1A, the disk drive further comprises a semiconductor memory (SM) 28 communicatively coupled to the control circuitry 20. The SM 28 can comprise, for example, dynamic random access memory (DRAM), Flash memory, or static random access memory (SRAM).

Figure 2A:
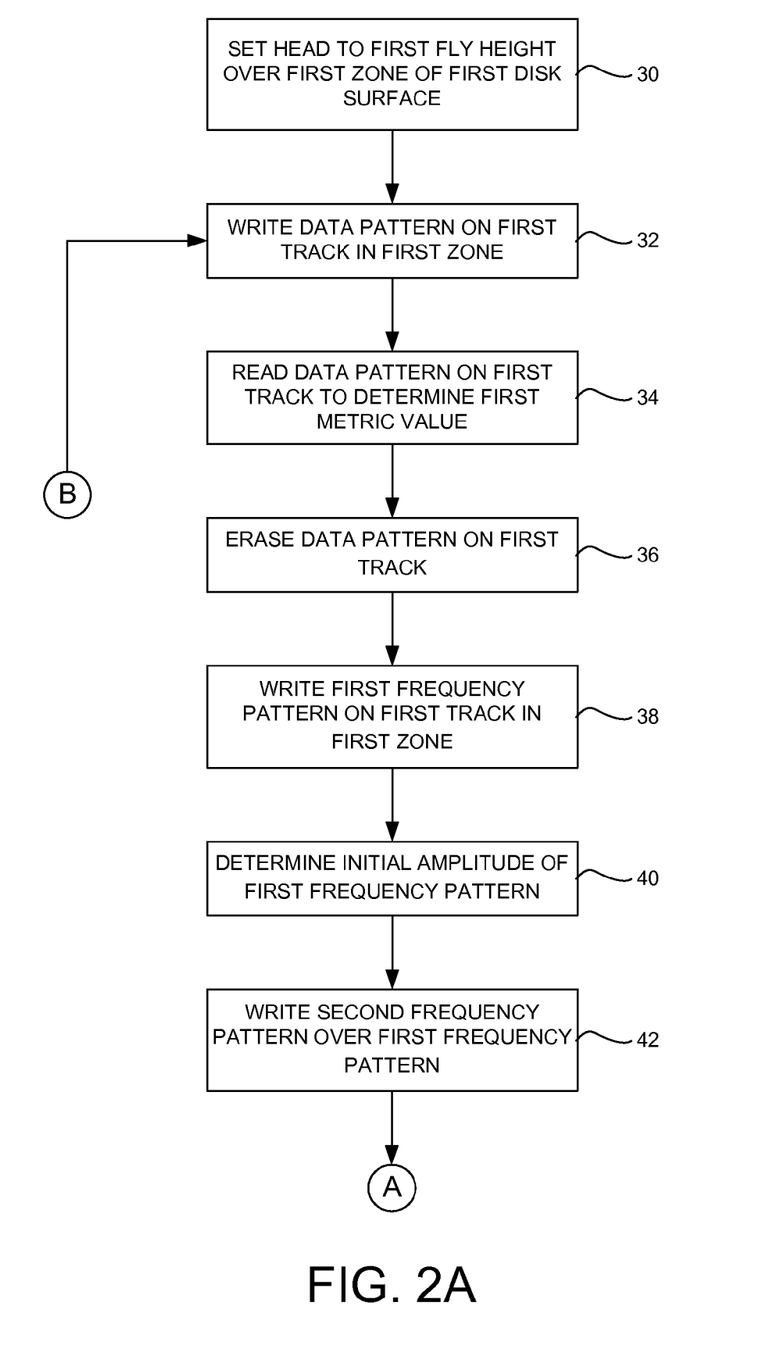
FIGS. 2A and 2B are flow diagrams according to an embodiment of the present invention wherein two metrics, such as bit error rate and overwrite, are used to determine a fly height value for each zone of a selected group of zones of a disk surface.

FIG. 2A is a flow diagram executed by the control circuitry 20 according to an embodiment of the present invention, wherein the control circuitry 20 sets a head $2_1$ to a first fly height over a first zone $10_1$-$10_M$ of a first disk surface $4_1$ (step 30). For example, the control circuitry 20 can set the head $2_1$ to the first fly height by appropriately adjusting the fly height control signal 26. In one embodiment, the control circuitry 20 can set the head $2_1$ to the first fly height by applying a predetermined amount of power via the fly height control signal 26 to a fly height actuator comprising a heater. The first fly height can be, for example, an initial fly height that is determined during a preliminary fly height calibration process. In an embodiment of the invention, the fly height control signal 26 comprises an analog signal that is used by the control circuitry 20 to apply current to the heater so as to adjust the fly height of the head $2_1$ over the first disk surface $4_1$. In one embodiment, the first zone (e.g., zone $10_1$) may be situated at the OD 14 of the disk surface $4_1$. In another embodiment, the first zone (e.g., zone $10_M$) may be situated at the ID 16 of the disk surface $4_1$.

In the embodiment of FIG. 2A, the control circuitry 20 writes a data pattern on a first track in a first zone (e.g., one of zones $10_1$-$10_M$) of a first disk surface (step 32), and reads the data pattern on the first track to determine a value of a first metric (step 34). The data pattern can be, for example, a random data pattern. In an embodiment of the invention, the first metric is an error rate. The error rate can be, for example, a bit error rate or a symbol error rate, wherein a symbol corresponds to 10 bits. In one embodiment, the data pattern is written on multiple adjacent tracks in the first zone. In an embodiment of the invention, the first metric value (e.g., an error rate value) may be stored in SM 28.

In the embodiment of FIG. 2A, the control circuitry 20 erases the data pattern on the first track (step 36), and writes a first frequency pattern on the first track in the first zone (step 38). In an embodiment of the invention, the data pattern is erased by performing an AC erase process. In one embodiment, the first frequency pattern is written on multiple tracks in the first zone. In one embodiment, the first frequency pattern comprises a 2T frequency, wherein "T" is defined as one bit length. In the embodiment of FIG. 2A, the control circuitry 20 determines an initial amplitude of the first frequency pattern (step 40), and writes a second frequency pattern over the first frequency pattern (step 42). In an embodiment of the invention, the initial amplitude may be stored in SM 28. In one embodiment, the second frequency pattern comprises a higher frequency than the first frequency pattern. In one embodiment, the second frequency pattern comprises a 13T frequency.

Figure 2B:
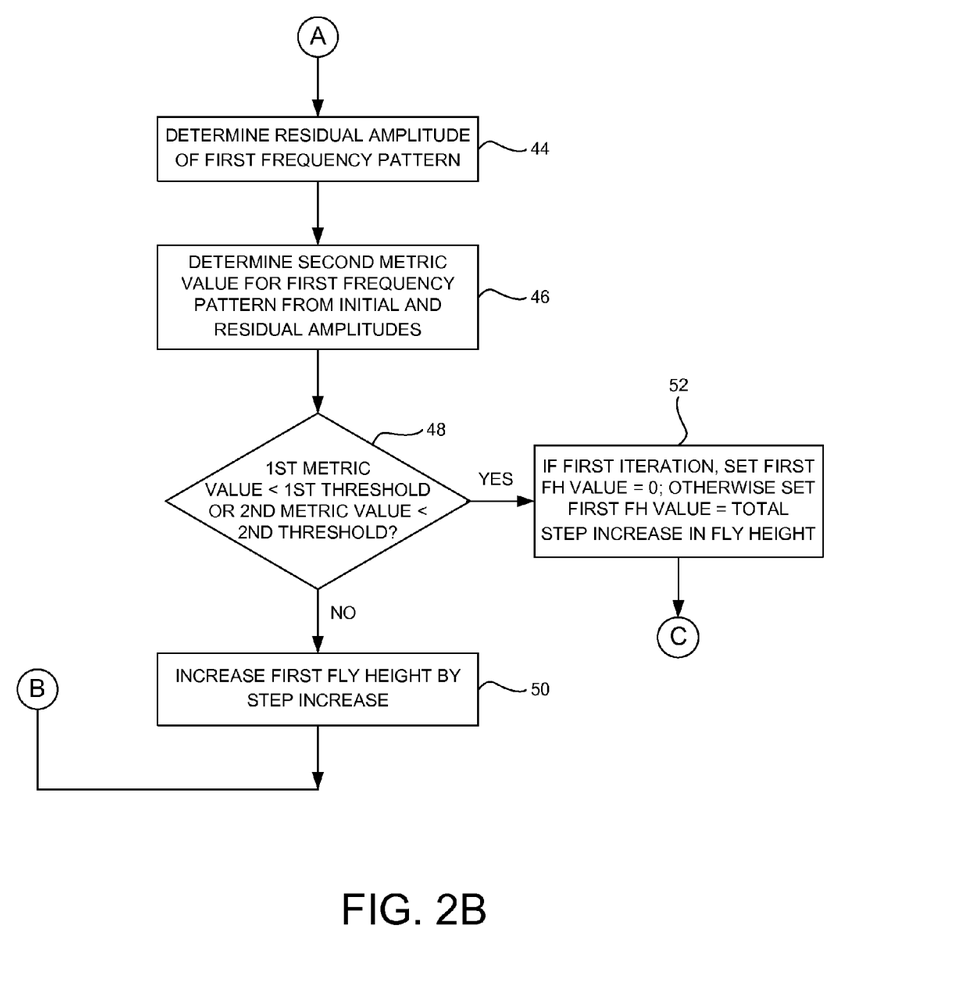

FIG. 2B is a flow diagram according to an embodiment of the present invention that extends the flow diagram of FIG. 2A. In the embodiment of FIG. 2B, the control circuitry 20 determines a residual amplitude of the first tone (step 44), and determines a value of a second metric for the first frequency pattern from the initial and residual amplitudes of the first frequency pattern (step 46). In an embodiment of the invention, the second metric is an overwrite ratio. The residual amplitude (i.e., the remaining signal strength) of the first frequency pattern can be determined, for example, by using a Fast Fourier Transform (FFT) at the frequency of the first frequency pattern. In an embodiment in which the second metric comprises an overwrite ratio, the overwrite ratio value for the first frequency pattern corresponds to a ratio of the residual amplitude over the initial amplitude of the first frequency.

In the embodiment of FIG. 2B, the control circuitry 20 determines whether the first metric value (e.g., the error rate value) is less than a first threshold (e.g., an error rate threshold) or the second metric value (e.g., the overwrite ratio value) is less than a second threshold (e.g., an overwrite ratio threshold) (step 48). In the embodiment of FIG. 2B, if the control circuitry 20 determines that the aforementioned condition is not met (i.e., the first and second metric values are greater than or equal to respective first and second thresholds), the control circuitry 20 increases the first fly height by a step increase (step 50), repeats steps 32-48 in the flow diagrams in FIGS. 2A and 2B, and provides an additional step increase in fly height after each iteration of steps 32-48 until the condition is met.

In one embodiment of the invention, if the control circuitry 20 determines that the aforementioned condition is met (i.e., either the first metric value is less than the first threshold or the second metric value is less than the second threshold) after the first iteration of steps 32-48, the control circuitry 20 sets a first fly height value equal to zero for the first zone of the first disk surface. If the control circuitry 20 determines that the aforementioned condition is met after multiple iterations of steps 32-50 in the flow diagrams in FIGS. 2A and 2B, the control circuitry 20 sets the first fly height value equal to the total number of step increases in fly height required to meet the condition. In an embodiment of the invention, the first fly height value comprises a first FH backoff delta.

Figure 2C:
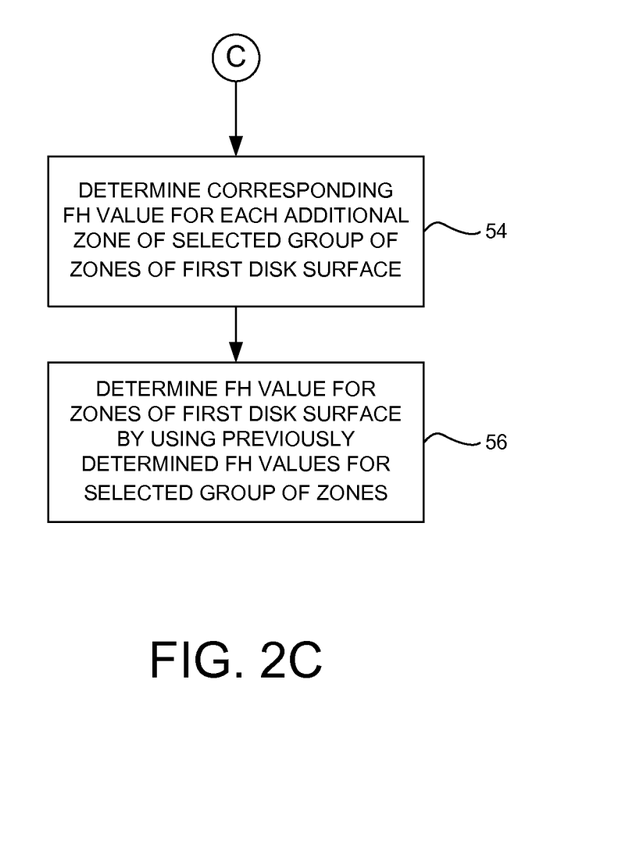
FIG. 2C is a flow diagram according to an embodiment of the present invention wherein fly height values for a selected group of zones of a disk surface are used to determine a fly height value for each zone of the disk surface.

FIG. 2C is a flow diagram according to an embodiment of the present invention that extends the flow diagram of FIG. 2B. In the embodiment of FIG. 2C, the control circuitry 20 determines a corresponding FH value for each additional zone of a selected group of zones of the first disk surface $4_1$ (step 54). In an embodiment of the invention, the control circuitry determines the corresponding FH values by performing steps 30-48 in the flow diagrams in FIGS. 2A and 2B and, if necessary, step 50 in the flow diagram in FIG. 2B for each additional zone. In one embodiment, the selected group of zones comprises three zones, wherein the first zone is situated at the OD 14 of the first disk surface $4_1$, the second zone is situated approximately midway between the OD 14 and the ID 16 of the first disk surface $4_1$ (i.e., at the mid diameter (MD)), and the third zone is situated at the ID 16 of the first disk surface $4_1$. In an embodiment wherein the selected group comprises three zones, the control circuitry 20 determines second and third FH values for the respective second and third zones in addition to the first FH value for the first zone (determined at step 52 of the flow diagram in FIG. 2B).

In the embodiment of FIG. 2C, the control circuitry 20 determines a FH value for the zones $10_1$-$10_M$ of the first disk surface $4_1$ by using the previously determined FH values for the selected group of zones (step 56). In one embodiment of the invention, the control circuitry 20 determines a FH curve fit from the previously determined FH values for the selected group of zones, and then determines a FH value for each of the zones $10_1$-$10_M$ of the first disk surface $4_1$ from the FH curve fit. In one embodiment, the FH value comprises a FH backoff delta. In one embodiment, the FH curve fit comprises a linear FH curve fit. In another embodiment, the FH curve fit comprises a polynomial FH curve fit.

In one embodiment, the control circuitry 20 modifies the initial fly height for each of the zones $10_1$-$10_M$ of the first disk surface $4_1$ with the corresponding FH values, and stores the modified initial fly height in a fly height table. The fly height table can be stored, for example, on the disk surface $4_1$. In an embodiment of the invention, the FH curve fit extends across a portion of the disk surface, and the control circuitry 20 determines respective FH values for corresponding zones of the disk surface. In one embodiment, the control circuitry 20 modifies an initial FH for each zone of a group of zones with a respective FH value, determines a FH curve fit from the modified initial fly heights for the group of zones, and determines a FH value for each of the zones $10_1$-$10_M$ of the first disk surface $4_1$ from the FH curve fit.

In one embodiment of the invention, the control circuitry 20 performs the steps 30-56 in the flow diagrams of FIGS. 2A-2C to determine a FH value for each of the zones $10_1$-$10_M$ of each of the disk surfaces $4_1$-$4_4$ of the disk drive. In one embodiment, the control circuitry 20 determines a FH value for each first zone of a selected group of zones for each of the disk surfaces $4_1$-$4_4$, and then determines a FH value for each second zone of the selected group of zones for each of the disk surfaces $4_1$-$4_4$, and so forth. The control circuitry 20 determines each FH value for each of the selected group of zones in a similar manner as discussed in steps 30-52 of the flow diagrams in FIGS. 2A and 2B. In one embodiment, once the FH values for the selected group of zones for each of the disk surfaces $4_1$-$4_4$ have been determined, the control circuitry 20 uses the FH values for each selected group of zones to determine a FH curve fit for each of the disk surfaces $4_1$-$4_4$. The control circuitry 20 then utilizes the FH curve fit for each of the disk surfaces $4_1$-$4_4$ to determine a FH value for the zones $10_1$-$10_M$ of the corresponding disk surface. In one embodiment, the control circuitry 20 modifies an initial fly height for each of the zones $10_1$-$10_M$ of each of the disk surfaces $4_1$-$4_4$ with the corresponding FH values, and stores the modified initial fly height in the fly height table.

Figure 3:
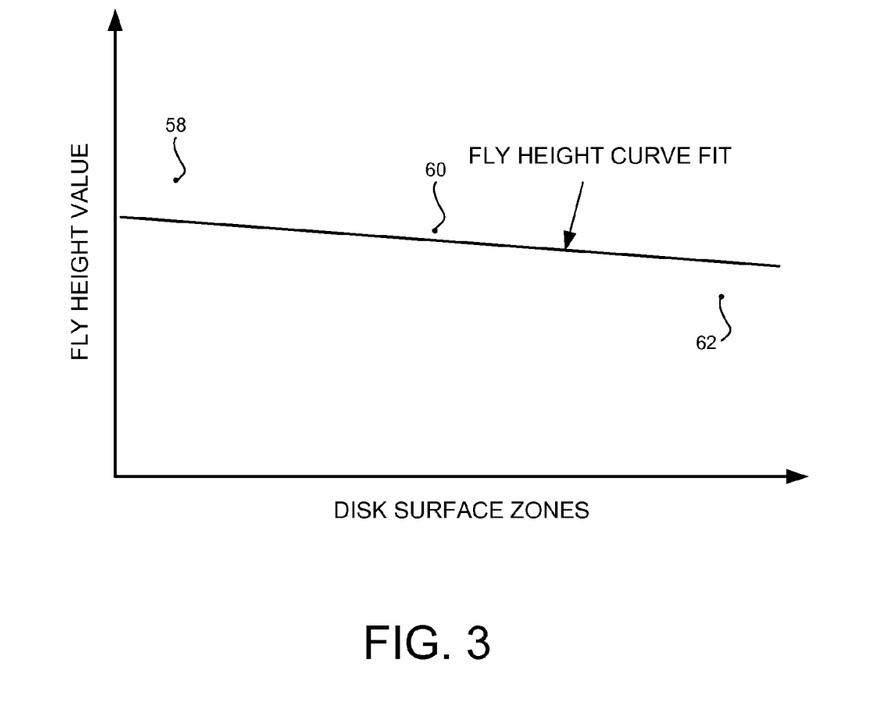
FIG. 3 is a graph according to an embodiment of the present invention showing a fly height curve fit determined from three fly height values corresponding to three respective zones of a disk surface, wherein the fly height curve fit is used to determine a fly height value for each zone of the disk surface.

FIG. 3 is a graph according to an embodiment of the present invention, wherein a FH curve fit is determined from points 58, 60 and 62. In the embodiment of FIG. 3, point 58 corresponds to a first FH value determined over a first zone of the disk surface $4_1$, point 60 corresponds to a second FH value determined over a second zone of the disk surface $4_1$, and point 62 corresponds to a third FH value determined over a third zone of the disk surface $4_1$. In the embodiment of FIG. 3, the FH curve fit is used to determine a FH value for each of the zones $10_1$-$10_M$ of the disk surface $4_1$.

It is noted that the steps in the flow diagrams in FIGS. 2A-2C are shown in a particular order to illustrate respective embodiments of the invention. In other embodiments, the steps in the flow diagrams in FIGS. 2A-2C may be performed in a different order.

Any suitable control circuitry 20 may be employed in the embodiments of the present invention, such as any suitable integrated circuit or circuits. For example, the control circuitry 20 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 20 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk surface $4_1$ and read into a volatile semiconductor memory when the disk drive is powered on. In yet another embodiment, the control circuitry 20 comprises suitable logic circuitry, such as state machine circuitry.

What is claimed is:

1. A disk drive comprising:
   a first disk surface comprising a plurality of zones, each zone comprising a plurality of tracks;
   a first head actuated radially over the first disk surface to write data to the first disk surface and read data from the first disk surface; and
   control circuitry coupled to the first head, the control circuitry operable to:
   (a) set the first head to a first fly height over a first zone of the first disk surface;
   (b) write a data pattern on a first track in the first zone of the first disk surface;
   (c) read the data pattern to determine a first value of a first metric;
   (d) erase the data pattern after reading the data pattern;
   (e) write a first frequency pattern on the first track in the first zone of the first disk surface;
   (f) determine an initial amplitude of the first frequency pattern;
   (g) write a second frequency pattern over the first frequency pattern;
   (h) determine a first value of a second metric for the first frequency pattern; and
   (i) determine a first fly height value for the first zone of the first disk surface by utilizing the first value of the first metric and the first value of the second metric.

2. The disk drive as recited in claim 1, wherein the first fly height value is determined when the first value of the first metric is less than a first threshold or the first value of the second metric is less than a second threshold.

3. The disk drive as recited in claim 2, wherein the control circuitry is further operable to:
set the first head to a second fly height over the first zone of the first disk surface; and
repeat steps (b) thru (h).

4. The disk drive as recited in claim 1, wherein the control circuitry is further operable to:
(i) set the first head to a second fly height over a second zone of the first disk surface;
(k) write the data pattern on a first track in the second zone of the first disk surface;
(l) read the data pattern to determine a second value of the first metric;
(m) write the first frequency pattern on the first track in the second zone of the first disk surface;
(n) determine an initial amplitude of the first frequency pattern;
(o) write the second frequency pattern over the first frequency pattern;
(p) determine a second value of the second metric for the first frequency pattern; and
(q) determine a second fly height value for the second zone of the first disk surface by utilizing the second value of the first metric and the second value of the second metric.

5. The disk drive as recited in claim 4, wherein the second fly height value is determined when the second value of the first metric is less than a first threshold or the second value of the second metric is less than a second threshold.

6. The disk drive as recited in claim 4, wherein the control circuitry is further operable to:
utilize the first and second fly height values to determine a fly height curve fit across a portion of the first disk surface; and
determine a third fly height value from the fly height curve fit.

7. The disk drive as recited in claim 4, wherein the first zone is located near an outer diameter of the first disk surface and the second zone is located near an inner diameter of the first disk surface.

8. The disk drive as recited in claim 1, further comprising:
a second disk surface comprising a plurality of zones, each zone comprising a plurality of tracks;
a second head actuated over the second disk surface to write data to the second disk surface and to read data from the second disk surface; and
the control circuitry coupled to the second head, the control circuitry further operable to:
(i) set the second head to a second fly height over a first zone of the second disk surface after determining the first fly height value for the first zone of the first disk surface;
(k) write the data pattern on a first track in the first zone of the second disk surface;
(l) read the data pattern to determine a second value of the first metric;
(m) write the first frequency pattern on the first track in the first zone of the second disk surface;
(n) determine an initial amplitude of the first frequency pattern;
(o) write the second frequency pattern over the first frequency pattern;
(p) determine a second value of the second metric for the first frequency pattern; and
(q) determine a second fly height value for the first zone of the second disk surface by utilizing the second value of the first metric and the second value of the second metric.

9. The disk drive as recited in claim 1, wherein the control circuitry is further operable to determine the first value of the second metric for the first frequency pattern by:
measuring a residual amplitude of the first frequency pattern; and
determining a ratio of the residual amplitude to the initial amplitude of the first frequency pattern.

10. The disk drive as recited in claim 1, further comprising a fly height actuator coupled to the control circuitry, wherein the first fly height value corresponds to an amount of decrease in power applied to the fly height actuator.

11. A disk drive comprising:
a first disk surface comprising a plurality of zones, each zone comprising a plurality of tracks;
a first head actuated radially over the first disk surface to write data to the first disk surface and read data from the first disk surface; and
control circuitry coupled to the first head, the control circuitry operable to:
(a) set the first head to a first fly height over a first zone of the first disk surface;
(b) write a data pattern on a first track in the first zone of the first disk surface;
(c) read the data pattern to determine a first value of a first metric;
(d) write a first frequency pattern on the first track in the first zone of the first disk surface;
(e) determine an initial amplitude of the first frequency pattern;
(f) write a second frequency pattern over the first frequency pattern;
(g) determine a first value of a second metric for the first frequency pattern; and
(h) determine a first fly height value for the first zone of the first disk surface by utilizing the first value of the first metric and the first value of the second metric;
wherein the first metric is an error rate and the second metric is an overwrite ratio.

12. The disk drive as recited in claim 11, wherein the error rate is a symbol error rate.

13. A method of operating a disk drive, the disk drive comprising a first disk surface, the first disk surface comprising a plurality of zones, each zone comprising a plurality of tracks, a first head actuated radially over the first disk surface to write data to the first disk surface and read data from the first disk surface, the method comprising:
(a) setting the first head to a first fly height over a first zone of the first disk surface;
(b) writing a data pattern on a first track in the first zone of the first disk surface;
(c) reading the data pattern to determine a first value of a first metric;
(d) erasing the data pattern after reading the data pattern
(e) writing a first frequency pattern on the first track in the first zone of the first disk surface;
(f) determining an initial amplitude of the first frequency pattern;
(g) writing a second frequency pattern over the first frequency pattern;
(h) determining a first value of a second metric for the first frequency pattern; and (i) determining a first fly height value for the first zone of the first disk surface by utilizing the first value of the first metric and first value of the second metric.

14. The method as recited in claim 13, wherein the first fly height value is determined when the first value of the first metric is less than a first threshold or the first value of the second metric is less than a second threshold.

15. The method as recited in claim 14, further comprising:
setting the first head to a second fly height over the first zone of the first disk surface; and
repeating steps (b) thru (h).

16. The method as recited in claim 13, further comprising:
(j) setting the first head to a second fly height over a second zone of the first disk surface;
(k) writing the data pattern on a first track in the second zone of the first disk surface;
(l) reading the data pattern to determine a second value for the first metric;
(m) writing the first frequency pattern on the first track in the second zone of the first disk surface;
(n) determining an initial amplitude of the first frequency pattern;
(o) writing the second frequency pattern over the first frequency pattern;
(p) determining a second value for the second metric for the first frequency pattern; and
(q) determining a second fly height value for the second zone of the first disk surface by utilizing the second value of the first metric and the second value of the second metric.

17. The method as recited in claim 16, wherein the second fly height value is determined when the second value of the first metric is less than a first threshold or the second value of the second metric is less than a second threshold.

18. The method as recited in claim 16, further comprising:
utilizing the first and second fly height values to determine a fly height curve fit across a portion of the first disk surface; and
determining a third fly height value from the fly height curve fit.

19. The method as recited in claim 16, wherein the first zone is located near an outer diameter of the first disk surface and the second zone is located near an inner diameter of the first disk surface.

20. The method as recited in claim 13, wherein:
the disk drive further comprises a second disk surface comprising a plurality of zones, each zone comprising a plurality of tracks, and a second head actuated radially over the second disk surface to write data to the second disk surface and read data from the second disk surface; and
further comprising:
(i) setting the second head to a second fly height over a first zone of the second disk surface;
(k) writing the data pattern on a first track in the first zone of the second disk surface;
(l) reading the data pattern to determine a second value of the first metric;
(m) writing the first frequency pattern on the first track in the first zone of the second disk surface;
(n) determining an initial amplitude of the first frequency pattern;
(o) writing the second frequency pattern over the first frequency pattern;
(p) determining a second value of the second metric for the first frequency pattern; and
(q) determining a second fly height value for the first zone of the second disk surface by utilizing the second value of the first metric and the second value of the second metric.

21. The method as recited in claim 13, further comprising determining the first value of the second metric for the first frequency pattern by:
measuring a residual amplitude of the first frequency pattern; and
determining a ratio of the residual amplitude to the initial amplitude of the first frequency pattern.

22. The method as recited in claim 13, wherein the disk drive further comprises a fly height actuator, and wherein the first fly height value corresponds to an amount of decrease in power applied to the fly height actuator.

23. The method as recited in claim 13, wherein the first metric is an error rate and the second metric is an overwrite ratio.

24. The method as recited in claim 23, wherein the error rate is a symbol error rate.

* * * * *